Nov. 16, 1926.  1,607,250
H. W. DYER
CONVERTIBLE CHILD'S VEHICLE
Filed Sept. 23, 1925   2 Sheets-Sheet 1

Harry W. Dyer  INVENTOR.
BY
ATTORNEY.

Nov. 16, 1926.  1,607,250
H. W. DYER
CONVERTIBLE CHILD'S VEHICLE
Filed Sept. 23, 1925     2 Sheets-Sheet 2

Harry W. Dyer  INVENTOR.

BY
                    ATTORNEY.

Patented Nov. 16, 1926.

1,607,250

UNITED STATES PATENT OFFICE.

HARRY W. DYER, OF NEW YORK, N. Y.

CONVERTIBLE CHILD'S VEHICLE.

Application filed September 23, 1925. Serial No. 58,158.

Figure 1A:
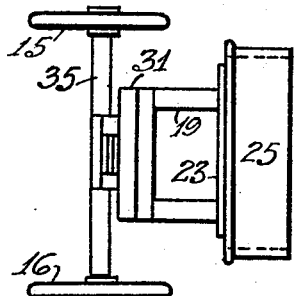
Figure 1:
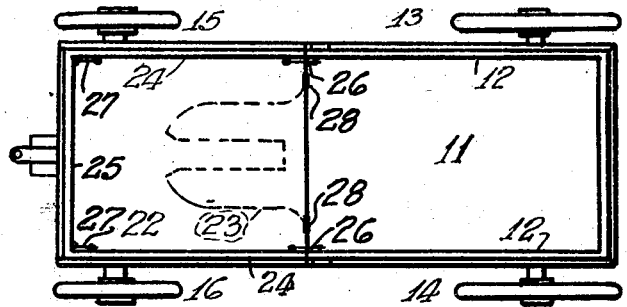
Figure 5:
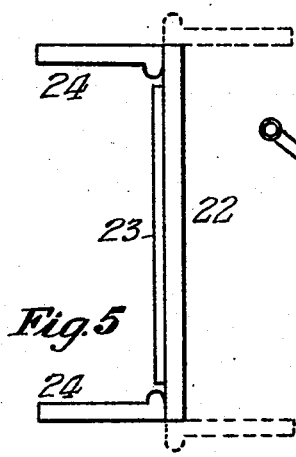
Figure 2:
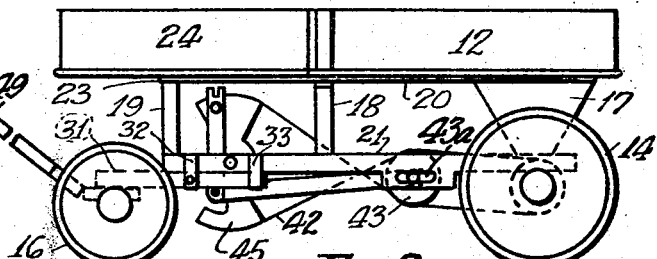
Figures 6, 7:
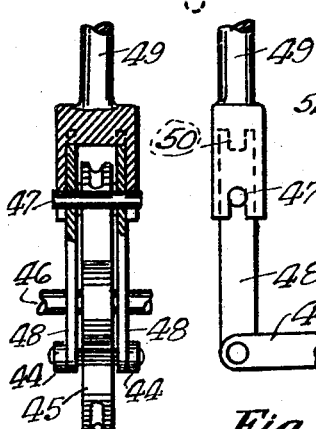
Figure 3:
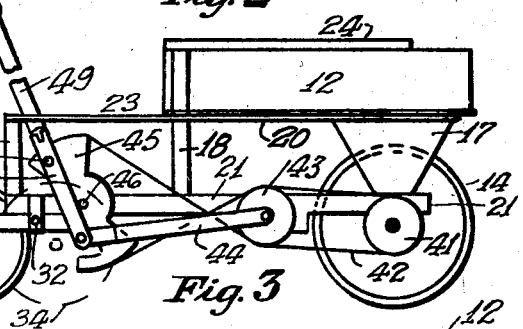
Figure 4:
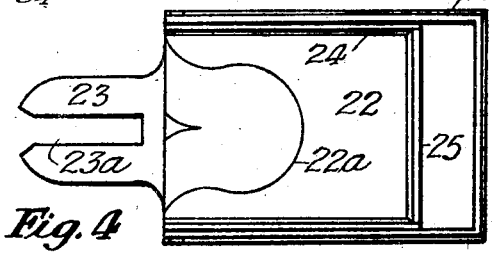
Figure 8:
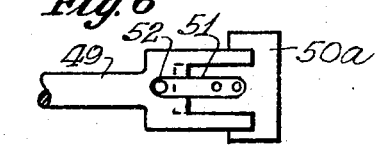
Figure 11:
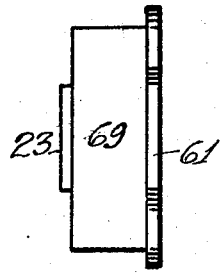
Figures 14, 15, 16:
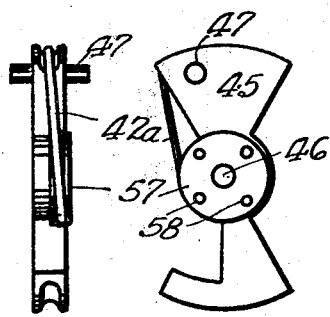

This invention relates to convertible child's vehicles and has for an object to provide a vehicle of this class which is collapsible and capable of being reduced in proportions and that is convertible from a wagon to a manually propelled vehicle and vice versa. These and other objects of the invention will be more particularly understood from the following specification and the accompanying drawings, in which, Fig. 1, is a plan view of a wagon complete constructed according to my invention, Fig. 1ª is an end elevation of the construction shown in Fig. 1 and Fig. 2 is a corresponding side elevation of the wagon shown in Fig. 1. Fig. 3 shows the construction in Fig. 2 converted into a manually propelled vehicle, Fig. 4 is a plan view of the body as converted in Fig. 3. Fig. 5 is a detail showing the construction of the wagon sides, Figs. 6, 7 and 8 show details in the construction of the operating handle. Figs. 9, 10, 11 and 12 show another arrangement for collapsing the wagon body and Fig. 13 shows another arrangement for the same purpose. Fig. 14 shows a type of operating mechanism in which the position of the operating handle and front wheels may be adjusted relative to the rear wheels and Figs. 15 and 16 are details of the mechanism used in Fig. 14. Either type of body may be used with either of the mechanisms shown as these parts are separately constructed.

This invention contemplates a child's wagon having a body supported upon a frame mounted upon four wheels and which includes a propelling mechanism. The wagon body is so constructed that the front portion may be folded within the rear portion which thereby provides a seat and exposes the propelling mechanism. This mechanism is provided with a detachable handle by means of which the operator can propel the vehicle while it is steered by the feet on the front axle. The detachable handle may be coupled to the front of the vehicle and used to draw the wagon along the ground. Provision is also made whereby the position of the front wheels is adjustable with relation to the rear wheels so that the proportions of the vehicle can thereby be condensed without, however, restricting its free motion on the wheels.

Referring to the drawings, 11 is the bottom of the rear portion of the wagon which is provided with sides 12 and extending in line therewith is the front portion 22 having the sides 24 forming a box enclosure of the usual type. This box rests upon a base 20 supported by the bolsters 17, 18 and 19 which in turn are supported by the frame 21 resting upon the rear wheels 13 and 14 and supported by the front wheels 15 and 16.

When it is desired to convert this wagon into a manually propelled vehicle, the hooks 26 which are of the ordinary type and used to connect the sides 12 and 24 together are removed, also the hooks 27 which connect the end 25 with the sides 24 are removed. The sides and end are hinged to turn down as indicated in solid lines in Fig. 5 and the bottom 22 is hinged at 28 to the rear bottom 11 so that the front portion may now be turned over and will fall within the rear portion as indicated in Figs. 3 and 4. The underside of 22 has a seat 22ª formed therein for the rider as shown in Fig. 4. When the front is turned over as described this exposes the forward portion 23 of the base 20 which is provided with a slot 23ª for the operating handle.

The front wheels, it will be noted, are connected with a frame 31 which is slidably connected at 32 and 33 with the frame 21 with the result that these wheels may be moved back on frame 21 as far as the dotted outline indicated at 34. This, it will be noted, considerably reduces the length of the vehicle in Fig. 3 and does not interfere with the free steering of the axle 35 nor with the movement of the wheels.

The propelling mechanism is clearly shown in Fig. 3 in which the wheels on one side have been omitted to show the details. The belt pulley 41 connects with the rear wheel 14. This pulley is engaged by the driving belt 42 which passes over idler 43, crosses as shown and connects to the rocker 45 which is pivoted at 46 to the frame 21. The arm 48 is pivoted to the rocker at 47 and the lower end is pivotally connected to the rod 44 in the opposite end of which the idler 43 is pivoted. The detachable handle 49 is rigidly connected to the arm 48 and by this means the rocker is operated.

When the handle 49 is pulled towards the rider tension is applied to rods 44 which moves idler 43 in slot 43ª so as to tighten the belt 42. At the same time the upper end of rocker 45 is moved back by means of the pivotal connection 47 thus driving the pulley 41 from the rocker 45. When the handle 49 is pushed away from the rider the idler 43 is moved in slot 43ª so as to slacken the belt permitting it to slip over pulley 41 while the mechanism is brought into position for the next operating stroke. This mechanism is fully described in application, Serial No. 638,771, and is not part of the present invention. It will be noted that when handle 49 is removed, the idler 43 assumes the position to slacken the belt and this mechanism is operatively disconnected from the running wheels.

The handle 49 is intended to be used for propelling the vehicle and for drawing the wagon. For this purpose the end slides over the end of arm 48, engaging the pivot pin 47 as shown in Figs. 6 and 7. A slot in the end of arm 48 engages a ridge 50 in the handle 49 causing these parts to move together. This handle may be withdrawn and slid over the tongue 50ª connected to the front axle where it is held in position by the latch pin 52 controlled by spring 51. However, a separate handle may be used for this purpose; in carrying out the present invention it is only necessary to have a handle that will not project above 23 when the vehicle is converted into a wagon. In this connection, attention is called to the fact that the rocker 45 may be turned into the horizontal position simply by providing the necessary movement in slot 43ª for the rod 44. This would permit the handle 49 to assume a position which is almost horizontal.

Figure 9:
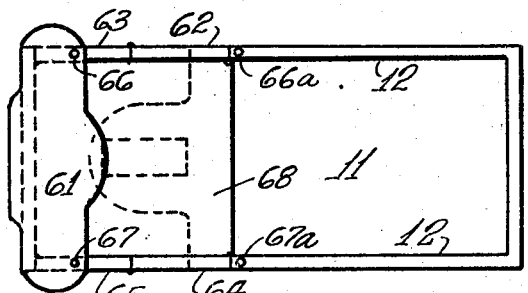
Figure 12:
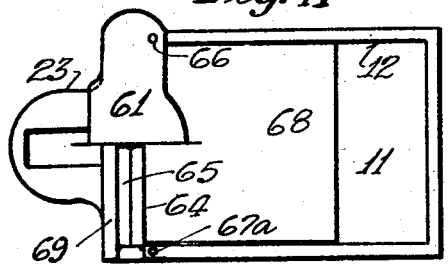
Figure 10:
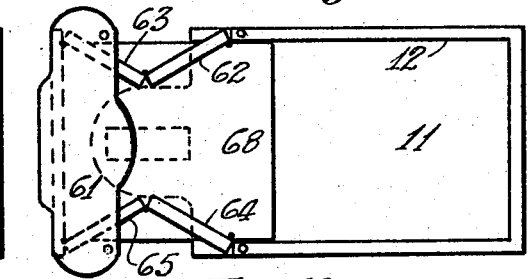
Figure 13:
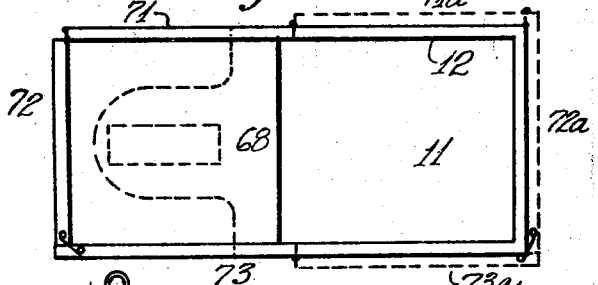

The body shown in Fig. 9 has the sides of the forward portion arranged to collapse inwardly as indicated in Fig. 10 where the sides 62 and 63, and the sides 64 and 65 are hinged to move horizontally and fold upon each other as indicated in Fig. 12. This action slides the forward bottom 68 over 11 and moves the end 69 towards the rear. The seat board 61 is provided with pins 66 and 67 which hold the sides in the normal position to form a wagon as shown in Fig. 10. When folded, these pins register with holes 67ª and form the means by which the seat board 61 is securely held to the rear part of the body and the sides are secured in the collapsed position.

In the construction shown in Fig. 13, the bottom 68 slides over the rear bottom 11 and the sides 71 and 72 fold around the sides of the rear portion as indicated in dotted outline at 71ª and 72ª. The side 73 folds around the opposite side as indicated at 73ª. These sides may be held in position by suitable hooks as shown.

The mechanism shown in Fig. 14 differs from the mechanism shown in Fig. 3 by having the position of the rocker adjustable with relation to the frame 21. It will be noted that the frame is made in two portions 21 and 56 which are slidably secured together by the cleats 32 and 33. A screw may be provided in one of these cleats as indicated in 32 to fix the position of 21 and 56. It will be seen that the front axle and the pivot 46 are supported by the frame 56 while the frame 21 supports the rear wheels and the body. The operating handle 49 can thus be brought closer to the seat for small children and moved away from the seat for larger children. In making this adjustment the slot in which the idler 43 works must be lengthened as shown and a means must be provided to take up the extra slack in the belt. This means is illustrated in Figs. 15 and 16. A slack wheel 57 is provided on the axis 46 of the rocker 45 and one end of the belt 42ª winds around this wheel while the other end of the belt is secured to the other end of the rocker. When it is necessary to take up slack the belt is wound around 57 and then this slack wheel is secured against turning by pins through the openings 58.

This construction provides a vehicle which is convertible to a number of purposes, adjustable to suit various sizes of riders, and collapsible to economize space.

Having thus described my invention, I claim:

1. A child's wagon of the class described comprising a body and a frame in two parts sliding one upon the other and upon which said body is mounted, a pair of front steering wheels and a pair of rear driving wheels supporting said frame, the position of said front wheels being adjustable relative to said body by sliding the parts of said frame upon each other.

2. In a child's vehicle of the class described, the combination of a body with a seat, a base supporting said body, a frame supporting said base, a propelling mechanism supported by said frame, said base covering said mechanism and means projecting through said base for operating said mechanism.

3. A child's vehicle of the class described comprising a body with a seat, a frame supporting said body, a propelling mechanism supported by said frame, a pair of rear wheels supporting said frame and a pair of front wheels adjustably positioned relative to said seat and arranged to steer said vehicle by the action of the feet.

4. A child's vehicle of the class described comprising a body with a seat, a frame supporting said body, a propelling mechanism supported by said frame, a set of steering wheels and a set of driving wheels supporting said frame and means for adjustably positioning said mechanism relative to said steering wheels.

5. A child's vehicle of the class described comprising a body with a seat, a frame supporting said body, a pair of rear wheels and a pair of steering wheels supporting said frame, a propelling mechanism supported by said frame and means for adjustably positioning said propelling mechanism and said steering wheels relative to said seat.

6. A child's vehicle of the class described comprising a body, a frame supporting said body, a pair of driving wheels associated with said frame, a propelling mechanism operated by a belt supported by said frame, means for adjustably positioning said mechanism relative to said wheels and means for adjusting the length of said belt as required by the position of said propelling mechanism.

7. A child's vehicle of the class described comprising a body, a frame supporting said body, running wheels associated with said frame, a rocking mechanism supported by said frame and connected with said wheels for propelling said vehicle, means for adjusting the position of said mechanism on said frame and means for correspondingly adjusting the connection between said mechanism and said wheels.

8. In a child's vehicle of the class described, the combination of a body with a folding seat, a base supporting said body, a frame supporting said base, a propelling mechanism supported by said frame, means projecting through said base for operating said mechanism, said seat, when in one position covering said base and said mechanism.

Signed at New York, in the county and State of New York, this 21st day of December, 1923.

HARRY W. DYER.